United States Patent Office 2,764,843
Patented Oct. 2, 1956

2,764,843

DEXTRAN-COATED SEEDS AND METHOD OF PREPARING THEM

Patricia Q. Peake, Washington, D. C., assignor to The Commonwealth Engineering Company of Ohio, Dayton, Ohio, a corporation of Ohio No Drawing. Application December 16, 1953,
Serial No. 398,651

13 Claims. (Cl. 47—1)

This invention relates to coated seeds and to methods of preparing them.

One object of the invention is to provide seeds which are large enough, and sufficiently alike in size and shape, for convenient handling by the machines used in the commercial planting of seeds.

Another object is to provide seeds with a protective coating that can be handled without damage.

A further object is to provide seeds with a protective coating that will not prevent or retard germination and which, when subjected to moisture of the earth after planting, softens to permit free emergence and growth of the germinated seed.

Another object is to provide seeds with a protective coating comprising a fungicidal material which prevents or prohibits infection of the seed or young plant by fungi present in the soil.

An additional object is to provide seeds with a protective coating comprising an insecticide or insect repellant whereby attack on the seeds by soil insects or worms is prevented.

These and other objects of the invention are accomplished by providing seeds with a protective coating of dextran.

The dextrans are high molecular weight polysaccharides made up of anhydroglucopyranosidic units joined by alpha-1,6 and non-alpha-1,6 molecular structural repeating linkages, at least 50% of these linkages being, apparently, of the alpha-1,6 type. They vary with respect to their molecular weight, molecular structural repeating alpha-1,6 to non-alpha-1,6 linkage ratios and water-sensitivity. Those dextrans used in the present method of protecting seeds may have a molecular weight in the range 5000 to $150 \times 10^6$, as determined by light scattering measurements, a molecular structural repeating alpha-1,6 to non-alpha-1,6 linkages ratio of 1.9:1 to 30:1, and form stable aqueous solutions or dispersions of 0.5% to 50% by weight concentration.

These dextrans may be obtained in various ways, but are usually obtained by enzymatic synthesis from sucrose in the presence or substantial absence of bacteria and cellular debris. Thus, a suitable microorganism, such as those of the *Leuconostoc mesenteroides* or *L. dextranicum* types may be cultured, the culture may be inoculated into a sucrose-containing solution containing appropriate inorganic salts and nitrogenous material, and the mass may be incubated until maximum dextran synthesis is achieved. Or the culture may be filtered to obtain a filtrate containing the dextran synthesizing enzyme, the filtrate, the enzyme isolated therefrom, or an aqueous solution of the isolated enzyme of suitable potency may be introduced into the sucrose-bearing medium and the whole held until the dextran is synthesized.

In either method, the dextran obtained, so-called "native" dextran, has a very high molecular weight, usually measurable in the millions. It can be separated from the fermentate by the addition of a precipitant such as a lower aliphatic alcohol or ketone, purified or not, reduced to particulate form, and used, with the addition of water, to coat the seeds. The native high molecular weight dextrans are generally preferred but these may be partially hydrolyzed to lower molecular weight products or fractions useful in providing seeds of various types with a dextran protective coating.

The seeds may be given a uniform coating of the dextran by placing them in a tumbler with an aqueous solution or dispersion of dextran in a concentration varying with the molecular weight of the dextran but sufficient to impart the desired viscosity to the mass. Suitable concentrations of the native high molecular weight dextrans are 5–15%. The lower molecular weight dextrans may be used in somewhat higher concentrations of 20–25% by weight. The thickness of the coating can be controlled by regulating the time of treatment correlated with the concentration of dextran in the aqueous medium. By controlling the conditions, and regardless of the shape and size of the seed itself, coated seeds which are smooth round pellets of substantially uniform size can be obtained. Preferably, the thickness of the dextran coating is such that the final size of the coated seed or pellet, after drying thereof, is at least twice the size of the untreated seed. The dextran being adhesive it adheres firmly to the surface of the seed.

After the seeds have been coatd and screened, they may be dried at temperatures below the sterilization temperature of the seed. For identification purposes, in order that the exact nature of the coated seed may be known, it is desirable to add small amounts of inert dyes, such as lampblack, chrome green and so on, to the dextran coating composition, a particular color being selected for a particular kind of seed, such as green for peas, red for beans, etc.

The invention is applicable to any type of seed but is particularly valuable in connection with seeds which grow in clusters which, if planted, result in crowding of the plants and expensive hand labor to thin, a problem met heretofore by segmenting the seed or by decorticating. Single seeds of this type may be coated with dextran to allow individual seed planting at spaced intervals, assuring a more even stand at lower labor cost than is ordinarily possible.

The dextran solution or dispersion may have admixed therewith small amounts (2–5% by weight) of substances which tend to modify the hardness of the coating, such as sandy alluvium capable of passing through a twenty-mesh screen, diatomaceous earth, finely divided clay, and the like.

Small amounts of fungicides or insecticides may also be included in the coating composition for deposition on the seeds.

After the coated seeds are dried they carry a firm smooth coating of the dextran which renders them easily handled in commercial planting machines. The dextran, being hydrophilic, absorbs moisture from the soil and gradually softens and swells to permit ready emergence of the seed. Dextran also has a stabilizing effect on soil and as it dissolves or falls off the seed and is disseminated in the soil by working thereof it functions to stabilize the soil particles in the form of small agglomerates the presence of which renders the soil porous for ready transfer of air and water below the soil surface.

As typical of the microorganisms which may be used in producing the dextran may be mentioned those microorganisms (or their enzymes) bearing the NRRL (Northern Regional Research Laboratory) classifications: *Leuconostoc mesenteroides* B–512, B–119, B–1190, B–1146, B–742, B–1191, B–1196, B–1208, B–1216, B–1144, B–1384; *Streptobacterium dextranicum* B–1254 and *Betabacterium vermiforme* B–1139. These native dextrans are either readily soluble in water, soluble therein under special conditions as now known, or dispersible in water. When a readily water-soluble dextran is desired and a microorganism which synthesizes a difficultly water-soluble dextran is used, the native product may be partially hydrolyzed to a lower molecular weight, readily water-soluble stage.

While details of the invention have been disclosed, it is recognized that changes and modifications may be made therein without departing from the spirit and scope of the invention which is not intended to be limited except as defined in the appended claims.

I claim:

1. A pelleted seed product comprising a plant seed having firmly adhered thereto a continuous dry enveloping coating consisting essentially of dextran having a molecular weight between 5000 and that of native unhydrolyzed dextran as produced by the action on sucrose of dextran-synthesizing strains of Leuconostoc determined by light scattering measurements, a molecular structural repeating alpha-1,6 to non-alpha-1,6 linkages ratio of 1.9:1 to 30:1, and which forms stable aqueous dispersions of from 0.5% to 50% by weight concentration.

2. A pelleted seed product comprising a plant seed having firmly adhered thereto a continuous, dry, enveloping coating consisting of dextran having a molecular weight between 5000 and that of native unhydrolyzed dextran as produced by the action on sucrose of dextran-synthesizing strains of Leuconostoc determined by light scattering measurements, a molecular structural repeating alpha-1,6 to non-alpha-1,6 linkages ratio of 1.9:1 to 30:1, and which forms stable aqueous dispersions of from 0.5% to 50% by weight concentration, the dextran having associated therewith a small amount of an identifying inert dye.

3. A pelleted seed product comprising a plant seed having firmly adhered thereto a dry continuous coating consisting of a mixture of dextran having a molecular weight between 5000 and that of native unhydrolyzed dextran as produced by the action on sucrose of dextran-synthesizing strains of Leuconostoc determined by light scattering measurements, a molecular structural repeating alpha-1,6 to non-alpha-1,6 linkages ratio of 1.9:1 to 30:1, and which forms stable aqueous dispersions of 0.5% to 50% by weight concentration, and from 2% to 5% by weight of an inert filler.

4. A pelleted seed product comprising a plant seed having firmly adhered thereto a dry continuous coating consisting of a mixture dextran having a molecular weight between 5000 and that of native unhydrolyzed dextran as produced by the action on sucrose of dextran-synthesizing strains of Leuconostoc determined by light scattering measurements, a molecular structural repeating alpha-1,6 to non-alpha-1,6 linkages ratio of 1.9:1 to 30:1, and which forms stable aqueous dispersions of 0.5% to 50% by weight concentration, and from 2% to 5% by weight of diatomaceous earth.

5. A pelleted seed product comprising a plant seed having firmly adhered thereto a dry continuous coating consisting of a mixture of dextran having a molecular weight between 5000 and that of native unhydrolyzed dextran as produced by the action on sucrose of dextran-synthesizing strains of Leuconostoc determined by light scattering measurements, a molecular structural repeating alpha-1,6 to non-alpha-1,6 linkages ratio of 1.9:1 to 30:1, and which forms stable aqueous dispersions of 0.5% to 50% by weight concentration, and from 2% to 5% by weight of finely divided clay.

6. A pelleted seed product comprising a plant seed having firmly adhered thereto a dry continuous coating consisting of a mixture of dextran having a molecular weight between 5000 and that of native unhydrolyzed dextran as produced by the action on sucrose of dextran-synthesizing stains of Leuconostoc determined by light scattering measurements, a molecular structural repeating alpha-1,6 to non-alpha-1,6 linkages ratio of 1.9:1 to 30:1, and which forms stable aqueous dispersions of 0.5% to 50% by weight concentration, and from 2% to 5% by weight of sandy alluvium.

7. A pelleted seed product comprising a plant seed having firmly adhered thereto a dry, continuous coating consisting essentially of native, unhydrolyzed dextran as produced by the action on sucrose of dextran-synthesizing strains of Leuconostoc, said dextran having a molecular structural repeating alpha-1,6 to non-alpha-1,6 linkages ratio of 1.9:1 to 30:1 and forming stable aqueous dispersions of from 0.5% to 50% by weight concentration.

8. A pelleted seed product comprising a plant seed having firmly adhered thereto a continuous, dry, enveloping coating consisting essentially of native, unhydrolyzed dextran as produced by the action on sucrose of the dextran-synthesizing strain of *Leuconostoc mesenteroides* classified as NRRL B–512.

9. A pelleted seed product comprising a plant seed having firmly adhered thereto a continuous, dry, enveloping coating consisting of dextran having the molecular weight of native, unhydrolyzed dextran as produced by the action on sucrose of dextran-synthesizing strains of Leuconostoc, a molecular structural repeating alpha-1,6 to non-alpha-1,6 linkages ratio of 1.9:1 to 30:1, and which forms stable aqueous dispersions of from 0.5% to 50% by weight concentration, the dextran having associated therewith a small amount of an inert dye for identifying the seeds.

10. A pelleted seed product comprising a plant seed having firmly adhered thereto a continuous, dry, enveloping coating consisting of a mixture of dextran having the molecular weight of native, unhydrolyzed dextran as produced by the action on sucrose of dextran-synthesizing strains of Leuconostoc, a molecular structural repeating alpha-1,6 to non-alpha-1,6 linkages ratio of 1.9:1 to 30:1, and which forms stable aqueous dispersions of from 0.5% to 50% by weight concentration, and from 2% to 5% by weight of an inert filler.

11. A pelleted seed product comprising a plant seed having firmly adhered thereto a continuous, dry, enveloping coating consisting of a mixture of dextran having the molecular weight of native, unhydrolyzed dextran as produced by the action on sucrose of dextran-synthesizing strains of Leuconostoc, a molecular structural repeating alpha-1,6 to non-alpha-1,6 linkages ratio of 1.9:1 to 30:1, and which forms stable aqueous dispersions of from 0.5% to 50% by weight concentration, and from 2% to 5 by weight of diatomaceous earth.

12. A pelleted seed product comprising a plant seed having firmly adhered thereto a continuous, dry, enveloping coating consisting of a mixture of dextran having the molecular weight of native, unhydrolyzed dextran as produced by the action on sucrose of dextran-synthesizing strains of Leuconostoc, a molecular structural repeating alpha-1,6 to non-alpha-1,6 linkages ratio of 1.9:1 to 30:1, and which forms stable aqueous dispersions of from 0.5% to 50% by weight concentration, and from 2% to 5% by weight of finely divided clay.

13. A pelleted seed product comprising a plant seed having firmly adhered thereto a continuous, dry, enveloping coating consisting of a mixture of dextran having the molecular weight of native, unhydrolyzed dextran as produced by the action on sucrose of dextran-synthesizing strains of Leuconostoc, a molecular structural repeating alpha-1,6 to non-alpha-1,6 linkages ratio of 1.9:1 to 30:1, and which forms stable aqueous dispersions of from 0.5 to 50% by weight concentration, and from 2% to 5% by weight of sandy alluvium.

(References on following page)

References Cited in the file of this patent

UNITED STATES PATENTS

| | | |
|---|---|---|
| 2,570,537 | Finch | Oct. 9, 1951 |
| 2,579,732 | Funsten | Dec. 25, 1951 |
| 2,651,883 | Hedrick | Sept. 15, 1953 |
| 2,671,985 | Vogelsang | Mar. 16, 1954 |

FOREIGN PATENTS

| | | |
|---|---|---|
| 657,693 | Great Britain | Sept. 26, 1951 |

OTHER REFERENCES

Geoghegan: "Aggregate Formation in Soil," pub. 1950 by Hoitsema Bros. (Groningen, Netherlands) in 4th International Congress of Soil Science, Amsterdam 1950, Transactions; vol. 1, pp. 198–201.

Owen: "Dextran . . . ," pub. February 1951 in Sugar, vol. 46, No. 2, pp. 40–41.